United States Patent
Wawrzynowicz

(10) Patent No.: US 8,948,370 B2
(45) Date of Patent: *Feb. 3, 2015

(54) SYSTEM AND METHOD FOR TELEPHONE CALL ROUTING USING A RELATIONAL ROUTING MATRIX

(71) Applicant: Hartford Fire Insurance Company, Hartford, CT (US)

(72) Inventor: Philip Wawrzynowicz, Lebanon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/317,543

(22) Filed: Jun. 27, 2014

(65) Prior Publication Data
US 2014/0307866 A1    Oct. 16, 2014

Related U.S. Application Data

(63) Continuation of application No. 13/857,470, filed on Apr. 5, 2013, now Pat. No. 8,798,256.

(60) Provisional application No. 61/736,131, filed on Dec. 12, 2012.

(51) Int. Cl.
*H04M 3/00*    (2006.01)
*H04M 5/00*    (2006.01)
*H04M 3/523*   (2006.01)
*H04M 3/51*    (2006.01)

(52) U.S. Cl.
CPC .......... *H04M 3/5232* (2013.01); *H04M 3/5166* (2013.01); *H04M 3/5191* (2013.01); *H04M 3/5233* (2013.01)
USPC ............ 379/265.11; 379/265.01; 379/265.05; 379/265.13; 379/272

(58) Field of Classification Search
USPC ............. 379/265.11, 265.12, 202.01, 265.01, 379/265.05, 265.13, 272, 266.01
See application file for complete search history.

(56) References Cited

U.S. PATENT DOCUMENTS 7,379,537 B2 *   5/2008   Bushey et al. ............. 379/88.01
7,457,395 B2 *   11/2008  Creamer et al. ........... 379/88.01

* cited by examiner

*Primary Examiner* — Thjuan K Addy
(74) *Attorney, Agent, or Firm* — Buckley, Maschoff & Talwalkar LLC

(57) ABSTRACT

A system, method, apparatus, means, and computer program code is provided wherein a telephone call is received. A telephone call routing matrix is accessed, from a relational database platform, to select a service representative for the received telephone call. It may then be arranged for the received telephone call to be routed in accordance with the selected service representative.

23 Claims, 15 Drawing Sheets

| DNIS 1302 | FLAG 1304 | CONDITION 1306 | VALUE 1308 | CSR IDENTIFIER 1310 |
|---|---|---|---|---|
| 1-800-555-1001 | LANGUAGE | EQUALS | SPANISH | CSR_101 |
| 1-800-555-1001 | LANGUAGE | EQUALS | CHINESE | CSR_102 |
| 1-800-555-1001 | INTENT | EQUALS | SALES | CSR_200 |
| 1-800-555-1001 | INTENT | EQUALS | CLAIMS | CSR_300 |
| 1-800-555-1001 | PRIOR WAIT | LESS THAN | 10 MINUTES | CSR_400 |

SYSTEM AND METHOD FOR TELEPHONE CALL ROUTING USING A RELATIONAL ROUTING MATRIX

CROSS-REFERENCE TO RELATED APPLICATIONS

This application is a continuation of U.S. patent application Ser. No. 13/857,470 filed on Apr. 5, 2013 entitled "System and Method for Telephone Call Routing Using a Relational Routing Matrix" which was based on and claimed benefit of and priority to U.S. Patent Application No. 61/736,131 filed on Dec. 12, 2012 and entitled "System and Method for Dynamic Configuration and Algorithms to Match Customers with Skilled Representatives," the contents of which are hereby incorporated by reference herein in their entirety for all purposes.

BACKGROUND

An enterprise may receive telephone calls from customers for various reasons. For example, an insurance company might receive telephone calls from customers regarding purchases of new insurance policies, billing questions, and/or inquiries about insurance claims. Moreover, an enterprise may have service representatives to answer telephone calls and help customers. Note that different service representatives may have different skills and/or other features. For example, one service representative might specialize in helping customers purchase new insurance policies while another service representative specializes in helping answering customer billing questions. Thus, a received telephone call may need to be eventually routed to an appropriate customer service representative.

According to one known approach, an enterprise may use different telephone numbers to determine which service representative will answer a customer's telephone call. In this case, however, a customer might not be aware of the appropriate telephone number and/or misunderstand the nature of his or her question. As another approach, a service representative can talk to a customer and manually re-route a telephone call to another, more appropriate, service representative as needed. This approach, however, can be time consuming task, especially when there are a substantial number of telephone calls and/or a relatively large number of potential customer service representatives. For example, a telephone call center might potentially receive millions of telephone calls each year. It would therefore be desirable to provide systems and methods to facilitate the routing of telephone calls from customers in an automated, efficient, scalable, and accurate manner. Moreover, it may be desirable to provide a simple interface that lets an end user implement, adjust, and/or modify business rules and/or combinations of business rules in connection with telephone call routing.

SUMMARY OF THE INVENTION

According to some embodiments, systems, methods, apparatus, computer program code and means may provide a tool to facilitate the routing of telephone calls. In some embodiments, a telephone call is received. A telephone call routing matrix is accessed, from a relational database platform, to select a service representative for the received telephone call. It may then be arranged for the received telephone call to be routed in accordance with the selected service representative.

Some embodiments provide: means for receiving a telephone call at a communications server; means for attempting to match information about the telephone call with at least one override flag to select a service representative terminal; if the information about the telephone call does not match the at least one override flag, means for accessing a telephone call routing matrix stored on a relational database platform to attempt to select a service representative terminal for the received telephone call; if a service representative terminal is not selected based on the telephone call routing matrix, means for selecting a service representative terminal in accordance with a default routing rule; and means for routing the received telephone to the selected service representative terminal.

A technical effect of some embodiments of the invention is an improved and computerized method to route telephone calls. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 13 is a tabular portion of a relational database routing matrix database according to some embodiments.

DESCRIPTION

Figure 1:
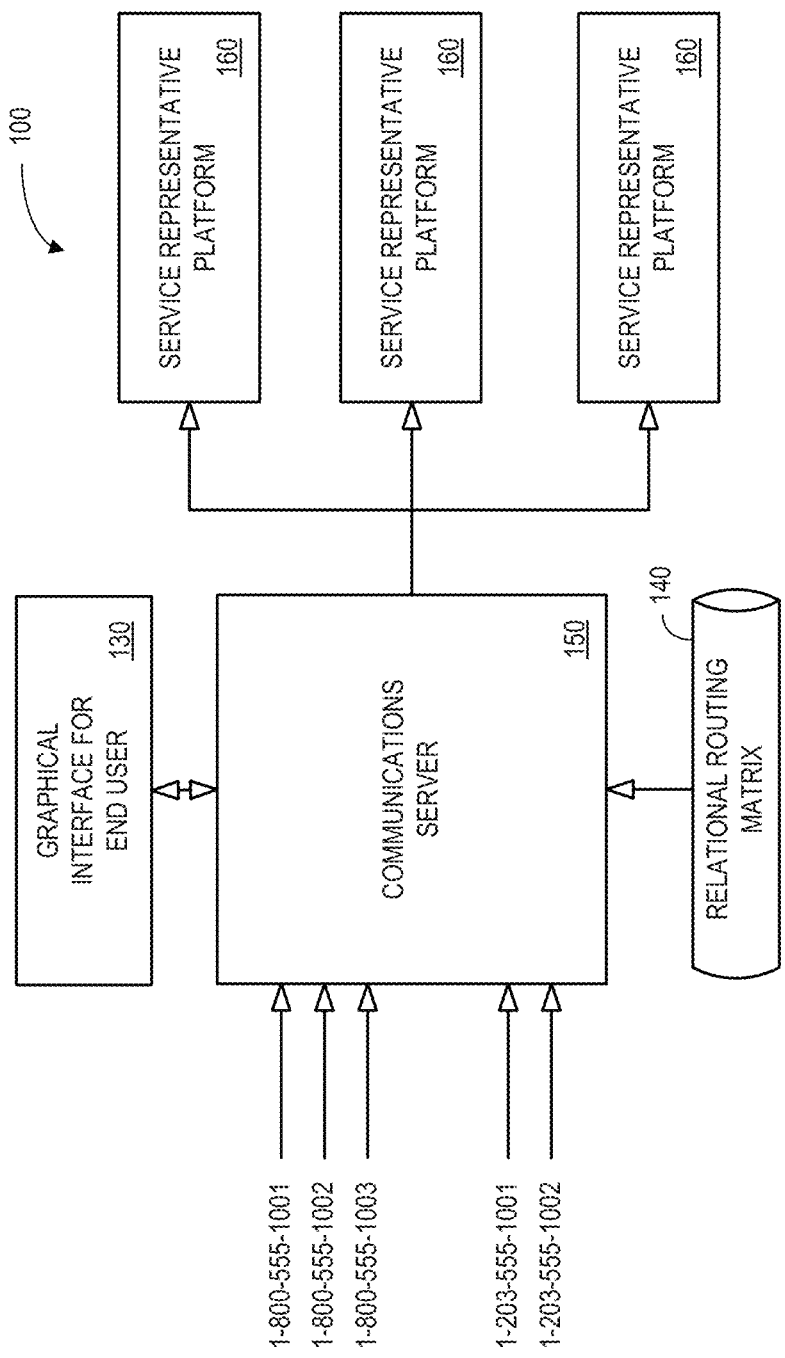
FIG. 1 is block diagram overview of a system according to some embodiments of the present invention.

An enterprise, such as an insurance company, may receive telephone calls from customers for various reasons (e.g., to purchase new policies or to ask questions about existing policies). Moreover, an enterprise may have customer service representatives to answer telephone calls and help customers, and different service representatives may have different skills and/or other features. For example, one service representative might speak Spanish while another service representative speaks English. Thus, a received telephone call may need to be eventually routed to an appropriate customer service representative. It may therefore be desirable to provide systems and methods to route incoming customer telephone calls in an automated, efficient, and accurate manner. FIG. 1 is block diagram of a system 100 according to some embodiments of the present invention. In particular, the system 100 includes a communications server 150 that receives incoming telephone calls from customer via various telephone numbers. The communications server 150 might be, for example, associated with a Personal Computers (PC), laptop computer, an enterprise server, a server farm, and/or a database or similar storage devices. The communications server 150 may, according to some embodiments, be associated with a business organization or an insurance provider.

The incoming telephone calls may be received, for example, via a communication network, such as the Public Switched Telephone Network ("PSTN"). Note that any embodiments described herein may also be associated with Internet telephony (referred to herein generally as "VoIP"). According to some embodiments, VoIP communications are implemented using session protocols such as those defined in the "Session Initiation Protocol" (or "SIP") which is defined in RFC-3261, "SIP: Session Initiation Protocol" which is hereby incorporated by reference for all purposes. As used herein, a "IP PBX" or "SIP Server" may refer to a type of PBX that connects to one or more client stations (or telephone handsets) on the private side by an IP network and to an Internet Telephone Service Provider ("ITSP") on the public side via an IP network (e.g., such as the Internet).

As used herein, devices, including those associated with the communications server 150 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

According to some embodiments, an "automated" communications server 150 may access a relational routing matrix 140 to facilitate the selection of an appropriate service representative platform 160 for each incoming telephone call. The service representative platforms 160 may comprise, for example, telephones or workstations operated by customer service representatives. As used herein, the term "automated" may refer to, for example, actions that can be performed with little or no human intervention.

The communications server 150 may store information into and/or retrieve information from the relational routing matrix database 140. The relational routing matrix 140 might be associated with, for example, business logic and rules to help route incoming telephone calls to service representative platforms 160. The relational routing matrix 140 may be locally stored or reside remote from the communications server 150. The term "relational" may refer to, for example, a collection of data items organized as a set of formally described tables from which data can be accessed. Moreover, a Relational Database Management System ("RDBMS") may be used in connection with database tables such that each table has a different primary key. According to some embodiments, a graphical interface for end user 130 may provide an ability to access and/or modify the relational routing matrix 140 via the communications server 150. The graphical interface for end user 130 might, for example, let an administrator define mapping rules, override flags, and/or defaulting routings between various incoming telephone calls and service representative platforms 160.

Although a single communications server 150 is shown in FIG. 1, any number of such devices may be included. Moreover, various devices described herein might be combined according to embodiments of the present invention. For example, in some embodiments, the claim communications server 150 and relational routing matrix 140 might be co-located and/or may comprise a single apparatus.

Figure 2:
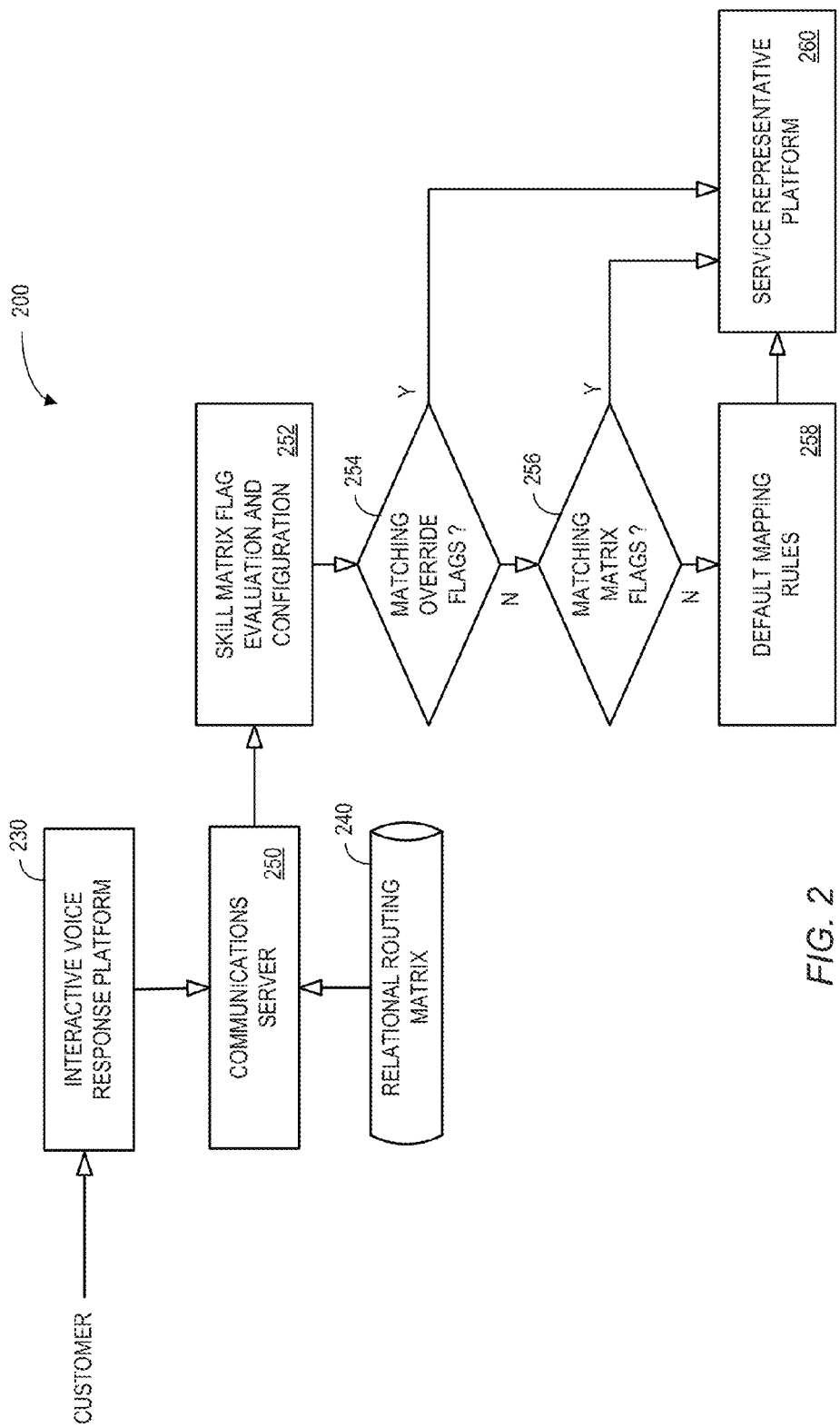
FIG. 2 illustrates a more detailed system according to some embodiments.

According to some embodiments, a business rules solution may be implemented in accordance with a relational RDBMS structure. For example, FIG. 2 illustrates a more detailed system 200 according to some embodiments that may provide a scalable model for telephone call control. The system 200 may support an enterprise as new lines of businesses are added or merged without requiring custom programming. As before, a communications server 250 may be provided to receive incoming telephone calls. According to this embodiment, an Interactive Voice Response or Recognition (IVR) platform 230 may be provided to receive information from the customer (e.g., by asking the customer to say or press "1" if they prefer to communicate in Spanish). Information from the IVR platform 230 may then be used along with information in a relational routing matrix 240 to determine an appropriate service representative platform 260 for the call. Note that difference service representative platforms 260 may be associated with a single customer queue or multiple customer queues. Moreover, according to any embodiment described herein, a customer's placement or priority within a queue might be determined along with the appropriate customer service representative.

According the embodiment of FIG. 2, the communications server 250 executes a skill matrix flag evaluation and configuration process 252. In particular, if any matching override flags are detected at 254, a call might be immediately routed to a service representative platform (e.g., it might be determined that the customer is very important and should be handled by a VIP customer service representative). The override flags may, for example, "override" the normal business logic applied to incoming telephone calls via the routing matrix. If no override flags were matched at 254, an array of matching matrix flags may be evaluated at 256. If the array of matching matrix flags indicate where a telephone call should be routed, the appropriate service representative platform 260 may be selected. If the array of matching matrix flags do not indicate where a telephone call should be routed, an appropriate service representative platform 260 may be selected based on default routing rules at 258.

Figure 3:
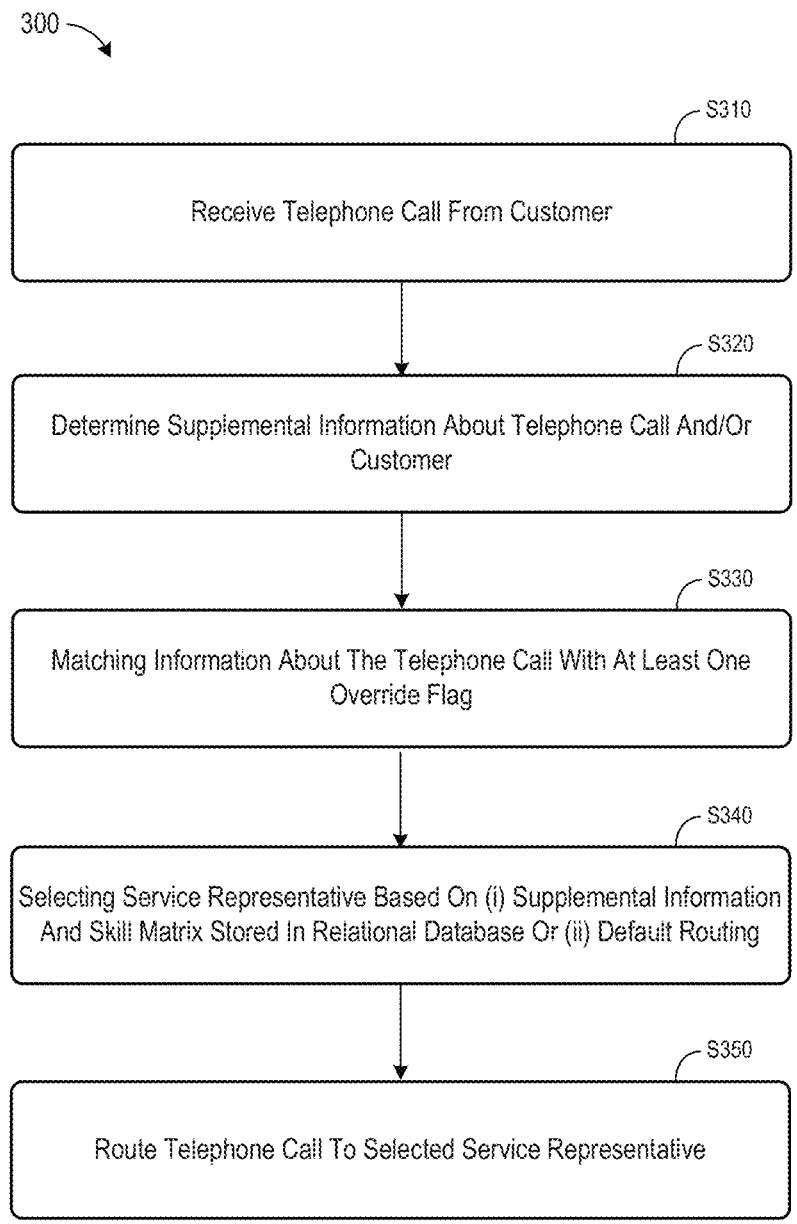
FIG. 3 illustrates a method that might be performed in accordance with some embodiments.

In this way, the system 200 may be streamlined by updates to the relational routing matrix 240 when changes are made. Moreover, a customer may be mapped to a customer service representative platform 260 using business rules and information gathered from the caller along (along with, in some cases, data matches returned from one or more databases). For example, FIG. 3 illustrates a method that might be performed by some or all of the elements of the systems 100, 200 described with respect to FIGS. 1 and 2 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a telephone call may be received from a customer. For example, a customer might call one of a number of different toll free or "1-800" numbers established by an enterprise. At S320, supplemental information about the customer associated may be determined. For example, an IVR system, a customer response, and/or pre-stored customer information. For example, a customer might enter a customer number, an insurance policy identifier, or a claim identifier. Using that information, a communications server might access a database and set or more override or priority flags associated with the telephone call. Such a database might be associated with, for example, a client database, a third party administrator, or a prior insurance provider. The supplemental information might, according to some embodiments, include a customer identifier, an insurance claim identifier, an insurance policy identifier, an insurance product identifier, and/or geographic information (e.g., an indication that a customer or insurance policy is associated with California).

At S330, information about the telephone call may be matched with at least one override flag. The override flag might, for example, indicate that the customer is very important and should always be handled by a particular customer service representative. At S340, a telephone call routing matrix may be accessed to select a service representative for the received telephone call. The routing matrix might be stored, for example, at a relational database platform. Note that the selection of a service representative might be based at least in part on Dialed Number Information Service data ("DNIS") (e.g., which number the customer dialed), a business rule, insurance product information, a language preference, queue information, and/or a service representative skill. In some cases, the selection may comprise selecting the service representative in accordance with a default routing rule (e.g., when no applicable business rule is found).

At S350, it may be arranged for the received telephone call to be routed in accordance with the selected service representative. For example, the telephone call might be automatically routed to an insurance claims handler.

Figure 4:
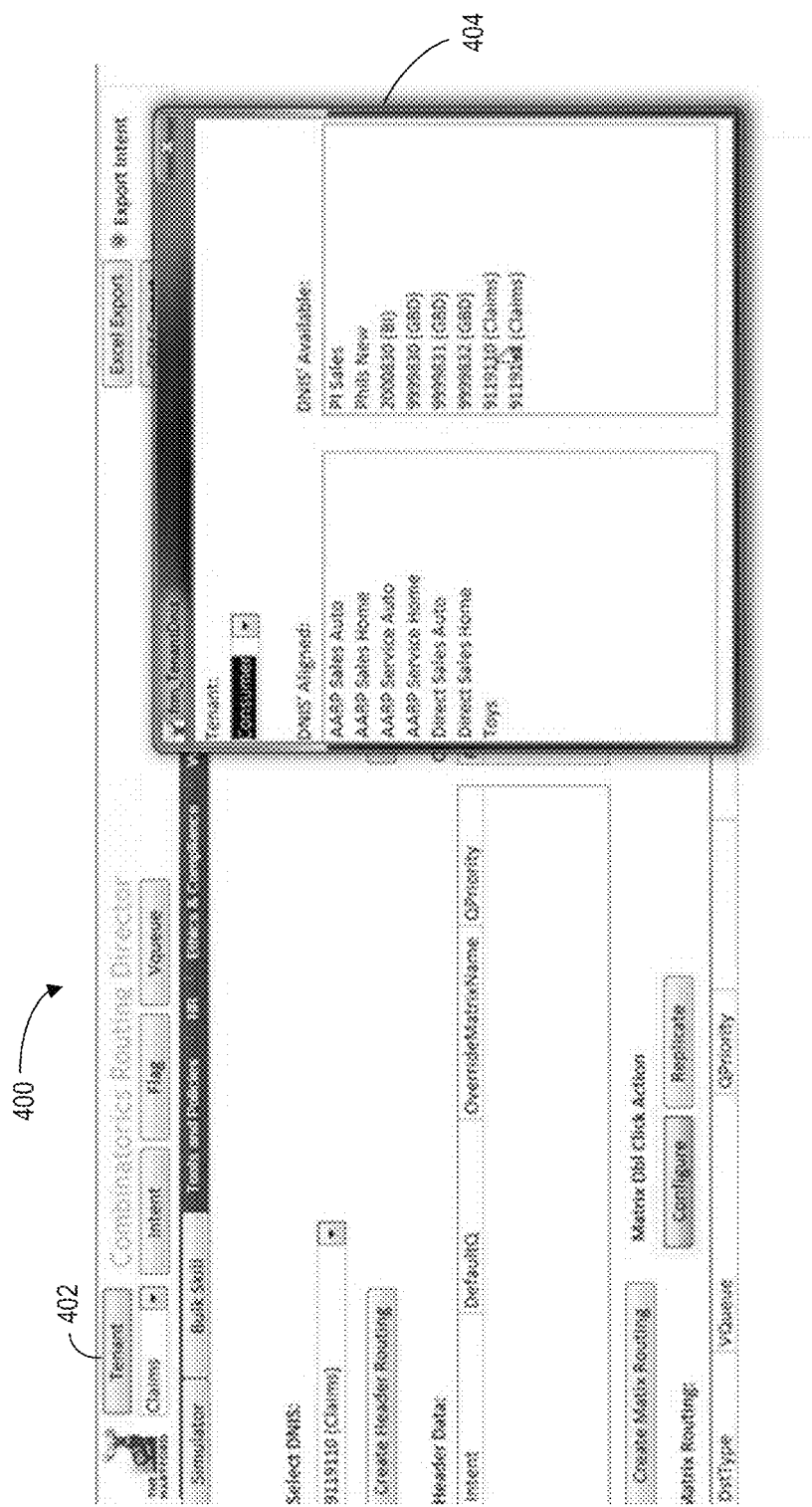
FIG. 4 illustrates a routing matrix display according to some embodiments of the present invention.

According to some embodiments, a system operator or administrator may interact with a communications server via a Graphical User Interface ("GUI") to adjust a telephone call routing matrix stored on a relational database platform. For example, FIG. 4 illustrates a routing matrix display 400 according to some embodiments of the present invention. The display 400 may allow a user to select a "tenant" icon 402 to define a line-of-business associated with the matrix (e.g., automobile insurance, homeowner's insurance, etc.). For each tenant, a tenant definition data entry portion 404 may let the user align available DNIS information to that tenant. For example, 50 incoming 1-800 numbers might be selected as being associated with that particular tenant (out of 1,000 available numbers).

Figure 5:
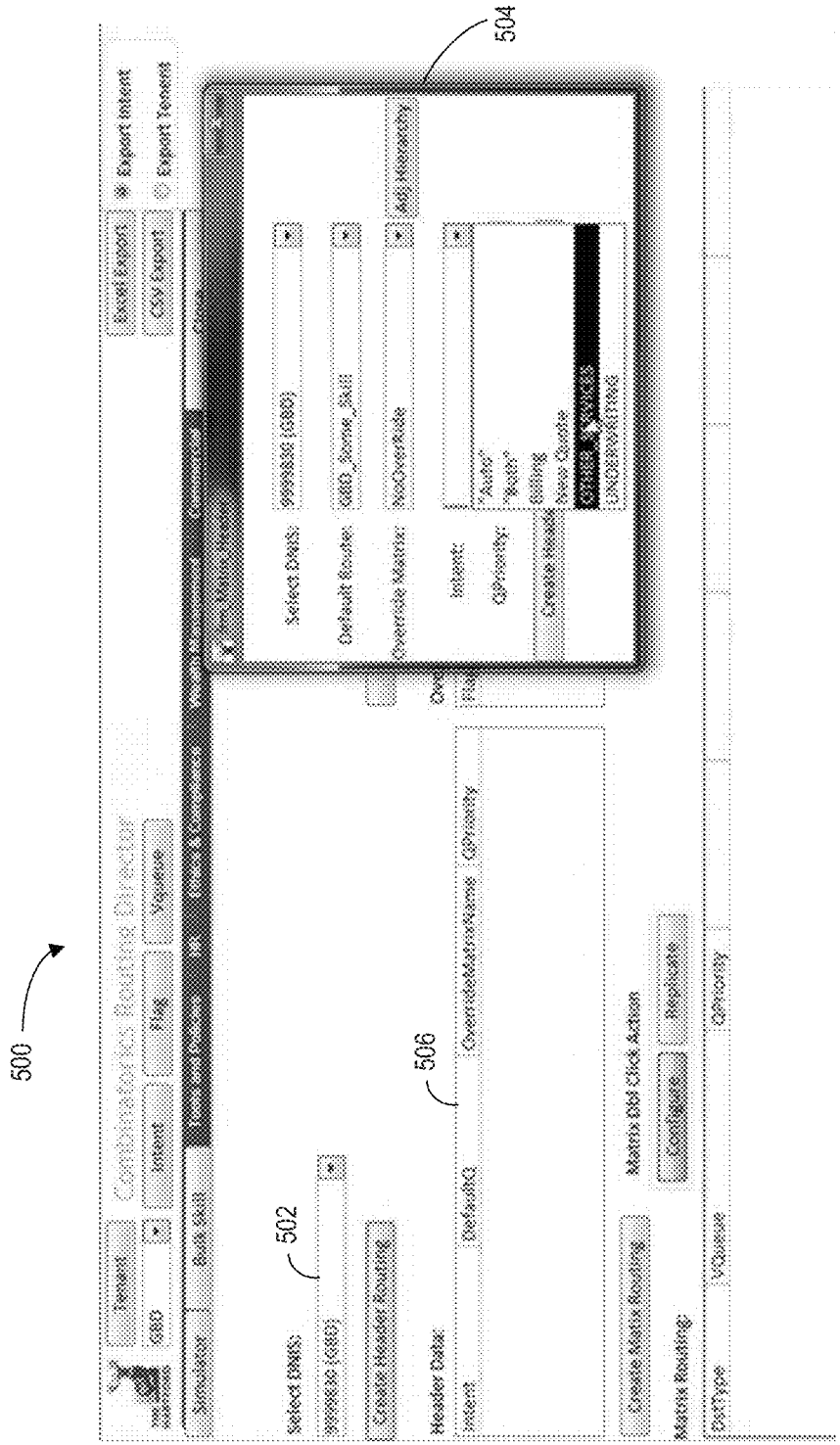
FIG. 5 illustrates a matrix header display according to some embodiments of the present invention.

A user may further define matrix information for each DNIS that is selected. For example, FIG. 5 illustrates a matrix header display 500 according to some embodiments of the present invention. The display 500 may let a user select a particular DNIS and provide a matrix header data entry portion 504 for that DNIS. The matrix header data entry portion 504 might, for example, let a user provide a default route, override matrix, and priority information. Once created, the header may appear in a header data portion 506 of the display 500.

Figure 6:
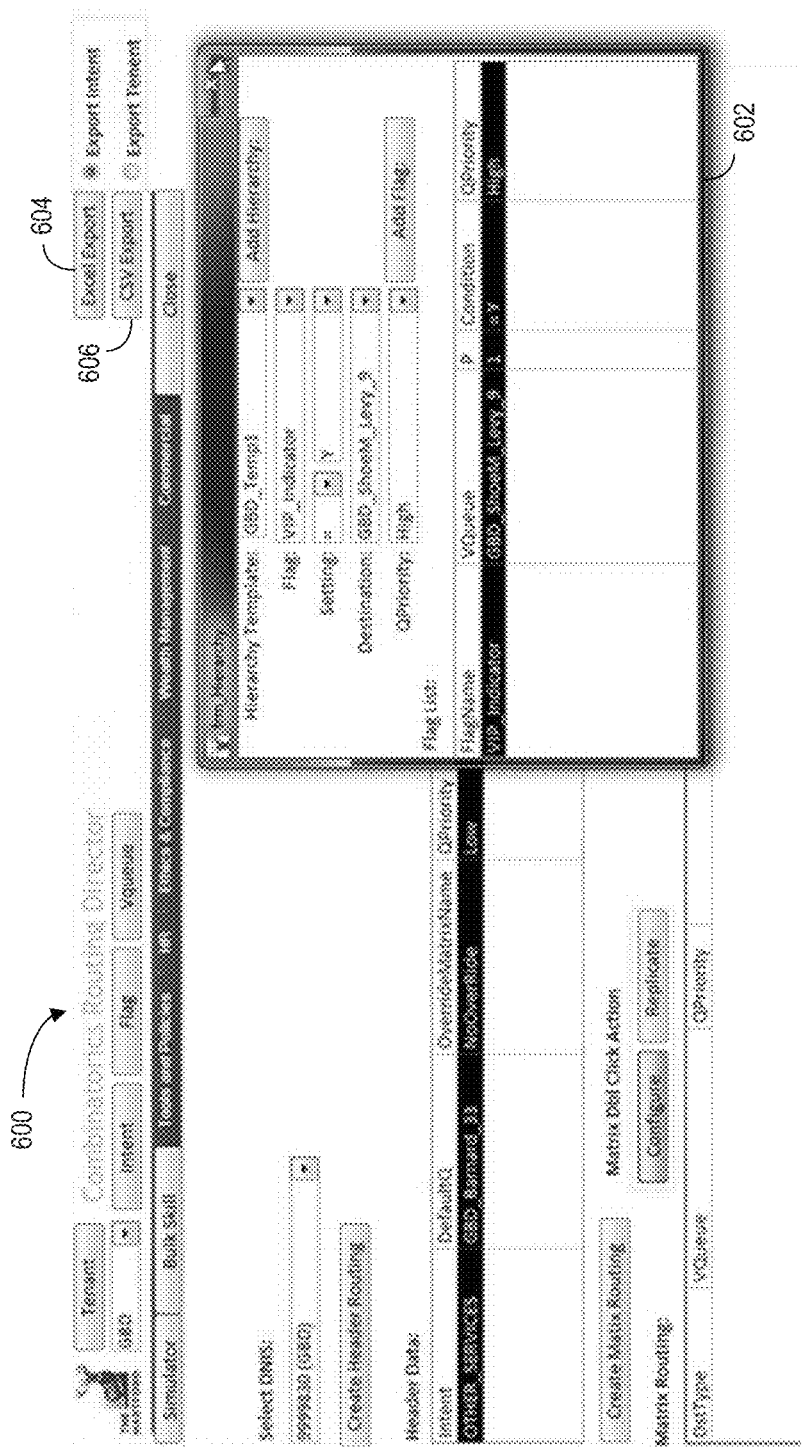
FIG. 6 illustrates a matrix hierarchy display according to some embodiments of the present invention.

A user may further define a hierarchy to be associated with a telephone call routing matrix. For example, FIG. 6 illustrates a matrix hierarchy display 600 according to some embodiments of the present invention. In particular, the display 600 includes a hierarchy data entry portion 602 where a user can select an appropriate template, flag and flag conditions along with a destination and priority to be applied when the conditions are met. For example, the hierarch data entry portion 602 might define a particular destination for incoming calls that have a "Language" flag equal to "Spanish." The display 600 may also let a user export information about the telephone call routing matrix, such as via a spreadsheet application icon 604 or a Comma Separated Value ("CSV") icon 606. The displays described herein, including the matrix hierarchy display 600, may help an end user build appropriate records for a telephone call routing matrix. The displays may automatically populate fields and potential fields and use a wizard-type navigation system to streamline and simply the process for the end user to facilitate an initial set up of, a periodic adjustment to, and/or a simulation of the business logic and rules associated with the telephone call matrix routing.

Figure 7:
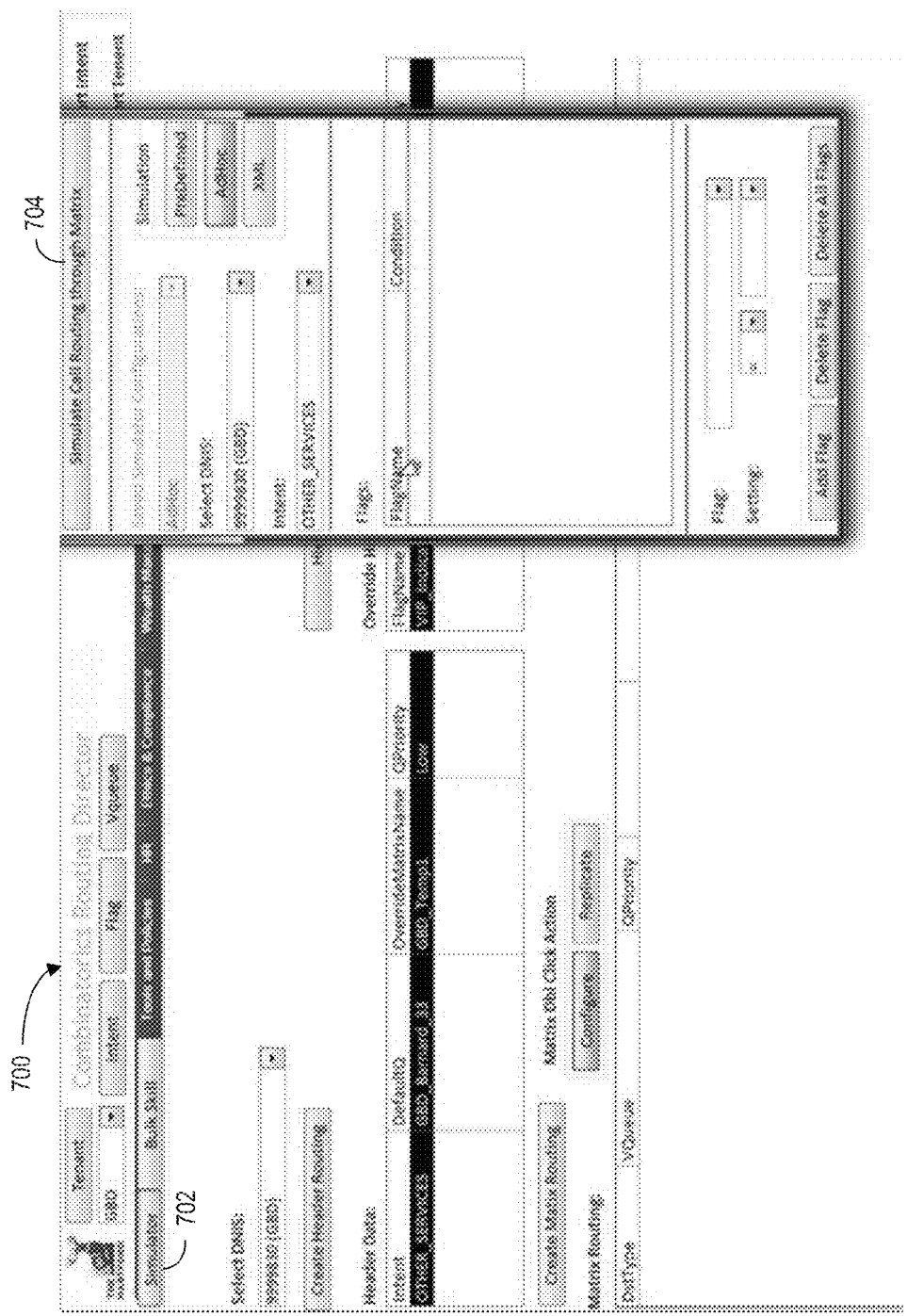
FIG. 7 illustrates a telephone call simulation display according to some embodiments of the present invention.
Figure 8:
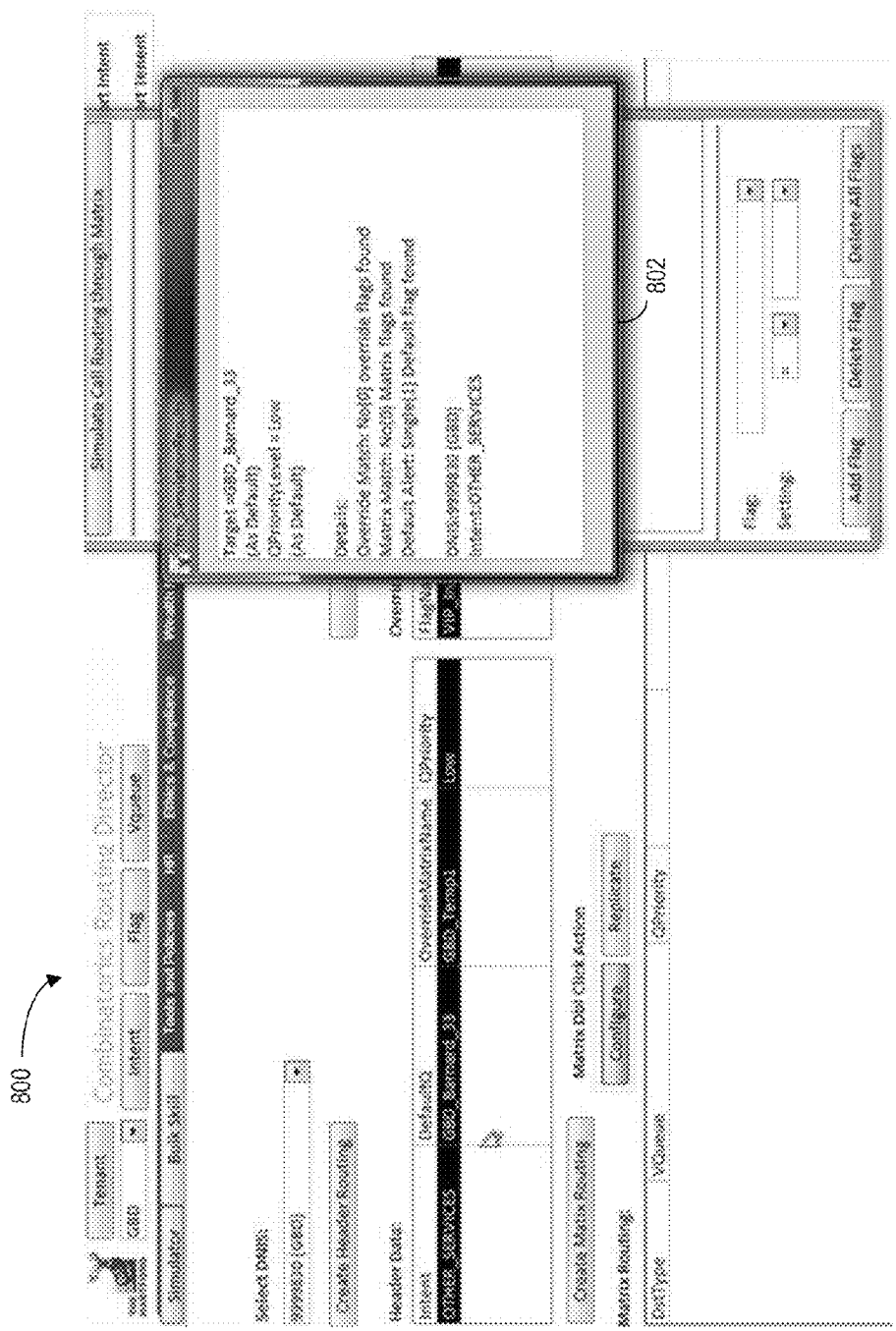
FIG. 8 illustrates a simulation result display according to some embodiments of the present invention.

According to some embodiments, a user may simulate an incoming telephone call. For example, FIG. 7 illustrates a telephone call simulation display 700 according to some embodiments of the present invention. The display 700 includes a telephone call simulation data entry portion 702 where a user may define a DNIS, an intent (e.g., the customer intends to ask a billing question) along with various flags that might be associated with a telephone call. These definitions may let a user test rules that are defined for a telephone call routing matrix. When the simulation is executed, the service representative selection result for the simulated telephone call may be displayed to the user. For example, FIG. 8 illustrates a simulation result display 800 according to some embodiments of the present invention. In particular, the display 800 includes a result display 802 indicating which service representative was selected along with information about the selection was made (e.g., whether any override or matrix flags were matched).

Figure 9:
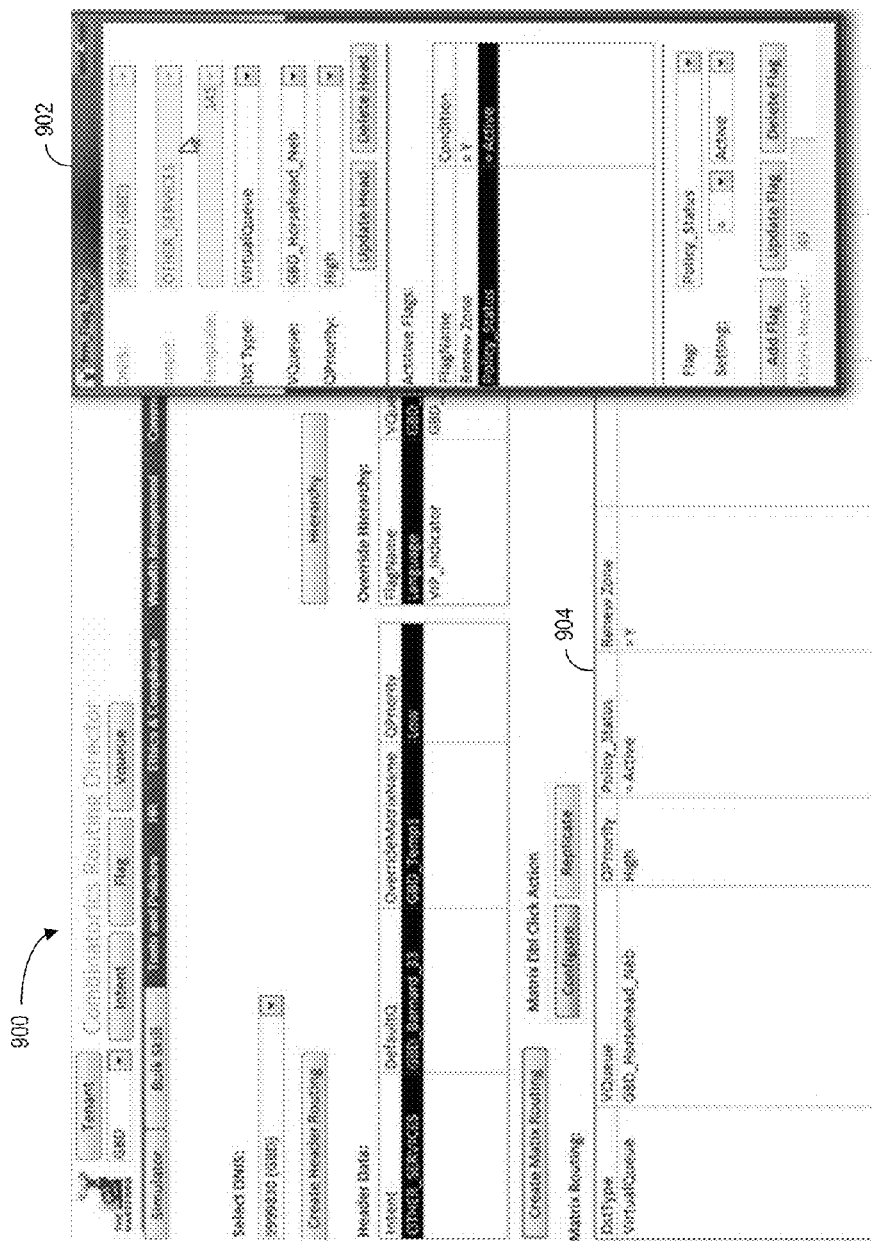
FIG. 9 illustrates a flag manager display according to some embodiments of the present invention.

A user may further define and manage flags associated with a telephone call routing matrix. For example, FIG. 9 illustrates a flag manager display 900 according to some embodiments of the present invention. The display 900 includes a flag manager data entry portion 902 displays a DNS, intent, template, type, queue, and priority for active flags. Moreover, the user may add, update, or delete flags as appropriate via the flag manager data entry portion 902. When a flag is active, it may be displayed 904 for further configuration and/or replication.

Figure 10:
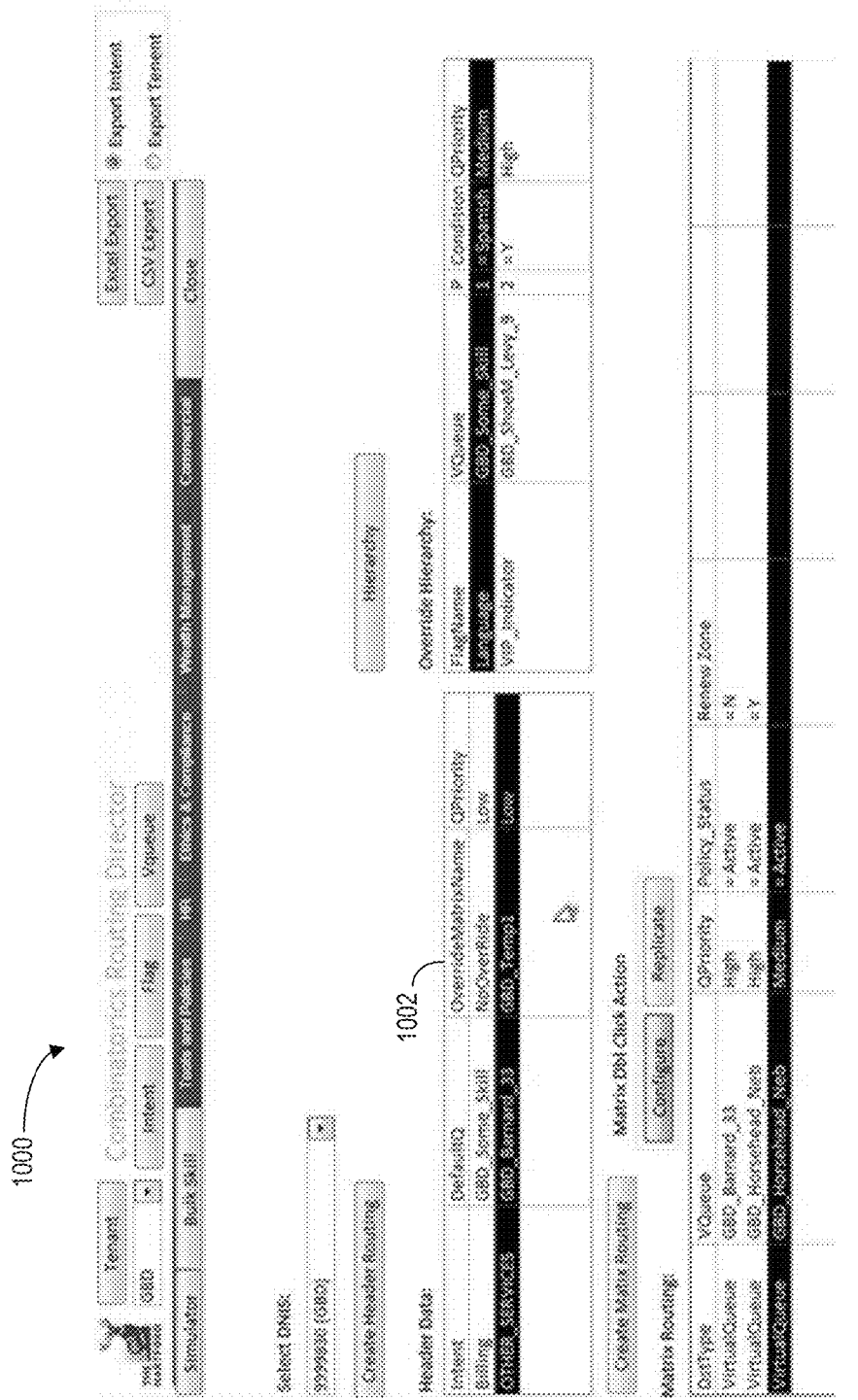
FIG. 10 illustrates a configuration display according to some embodiments of the present invention.

Note that although a single header is displayed in the example of FIG. 9, more than one header may be associated with a telephone call routing matrix. For example, FIG. 10 illustrates a configuration display 1000 according to some embodiments of the present invention. The display 1000 includes header data 1002 for both "billing" and "other services" headers.

Figure 11:
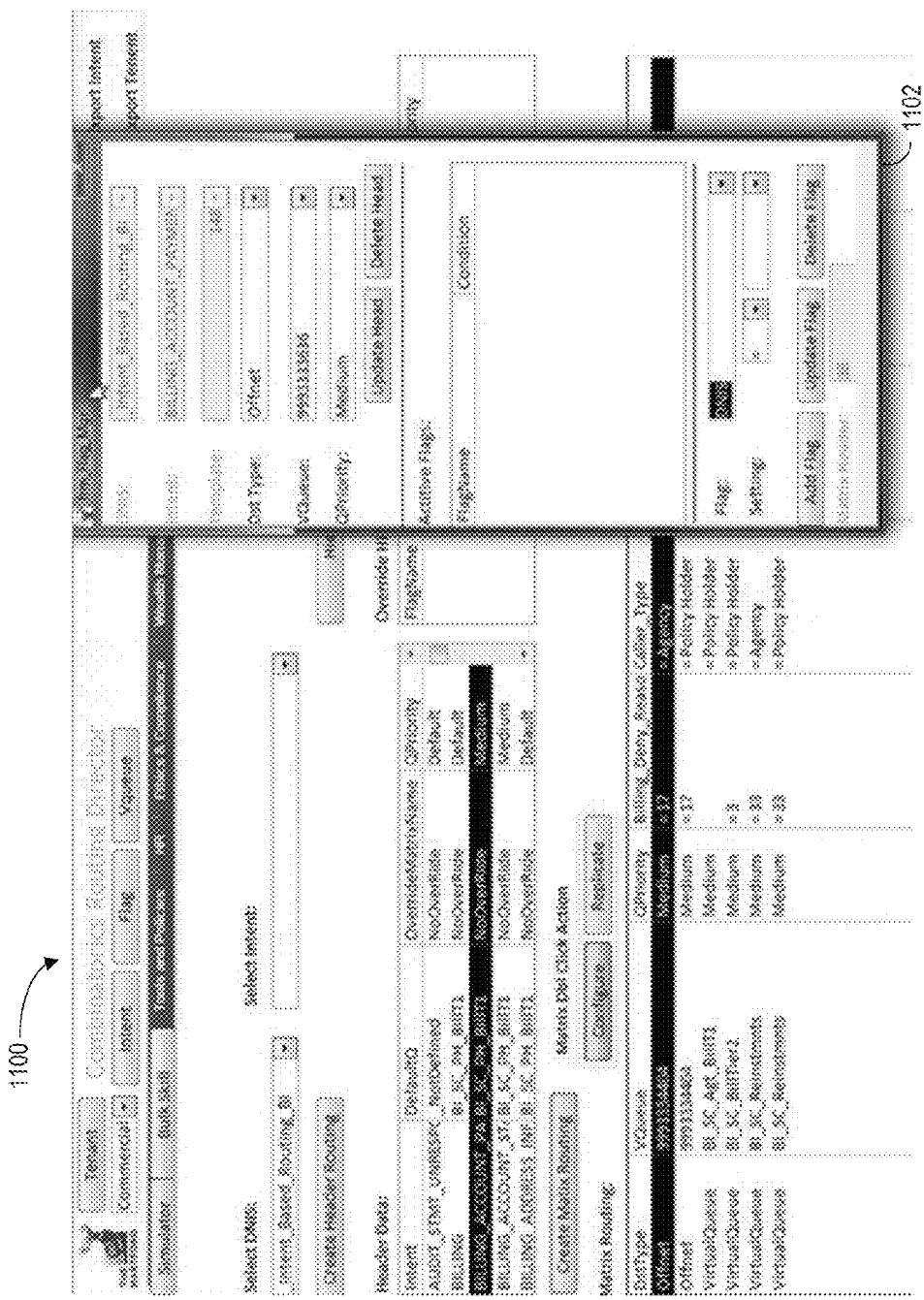
FIG. 11 illustrates a caller intent based display according to some embodiments of the present invention.

Note that headers may be defined on a DNIS-by-DNIS basis. According to some embodiments, headers may instead be defined based on the intent of the call. For example, FIG. 11 illustrates a caller intent based display 1100 according to some embodiments of the present invention. In this case, flag management 1102 may be provided for a selected intent of a caller (instead of the number he or she called). Note that in this approach, the DNIS (or phone number dialed by the customer) may be considered a flag to be considered when routing the telephone call.

Figure 12:
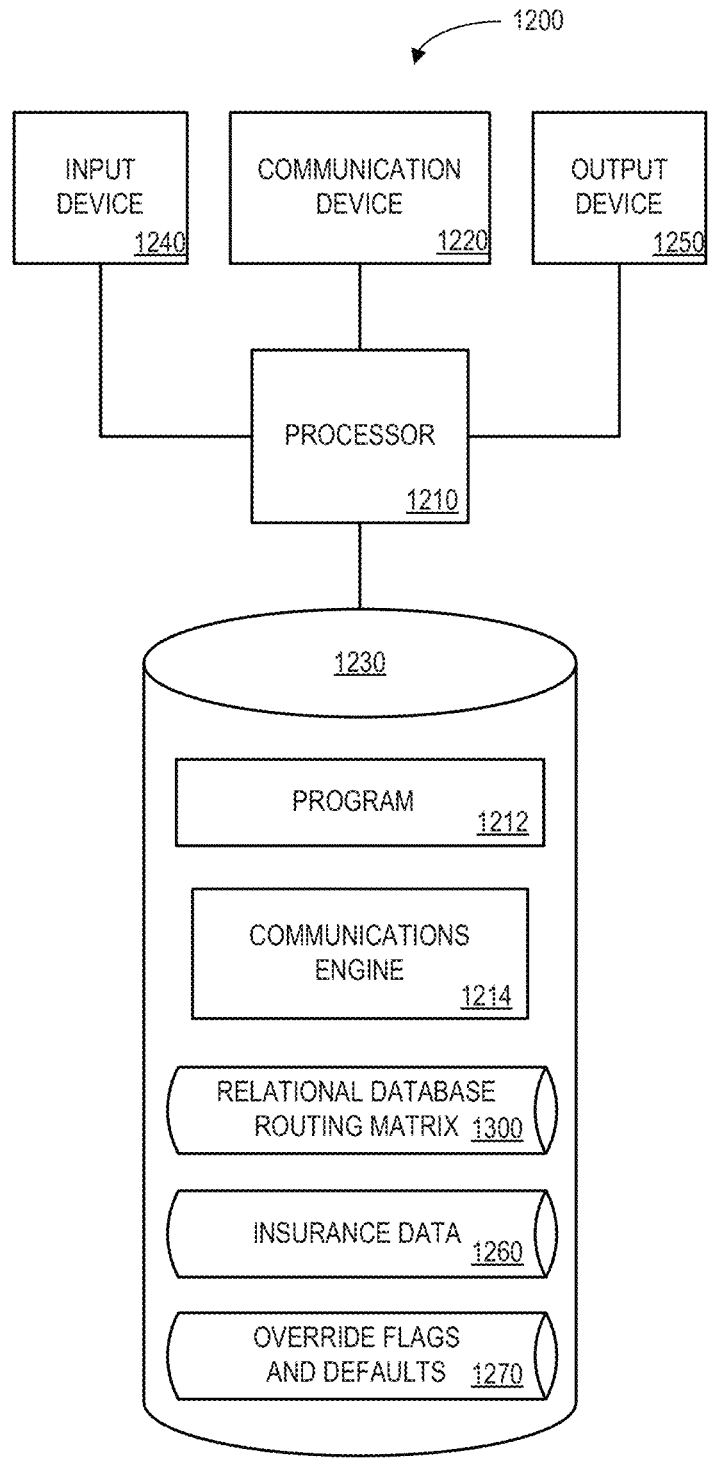
FIG. 12 is block diagram of a communications server or platform according to some embodiments of the present invention.

The embodiments described herein may be implemented using any number of different hardware configurations. For example, FIG. 12 illustrates a communications server 1200 that may be, for example, associated with the systems 100, 200 of FIGS. 1 and 2. The communications server 1200 comprises a processor 1210, such as one or more commercially available Central Processing Units (CPUs) in the form of one-chip microprocessors, coupled to a communication device 1220 configured to communicate via a communication network (not shown in FIG. 12). The communication device 1220 may be used to communicate, for example, with one or more customers and service representatives. The communications server 1200 further includes an input device 1240 (e.g., a mouse and/or keyboard to define matrix algorithms) and an output device 1250 (e.g., a computer monitor to display reports and simulation results).

The processor 1210 also communicates with a storage device 1230. The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or a communications engine 1214 (e.g., associated with a communications engine plug-in) for controlling the processor 1210. The processor 1210 performs instructions of the programs 1212, 1214, and thereby operates in accordance with any of the embodiments described herein. For example, the processor 1210 may receive a telephone call at a communications server and attempt to match information about the telephone call with at least one override flag to select a service representative terminal. If the information about the telephone call does not match the at least one override flag, the processor 1210 may access a telephone call routing matrix stored on a relational database platform to attempt to select a service representative terminal for the received telephone call. If a service representative terminal is not selected based on the telephone call routing matrix, the processor 1210 may select a service representative terminal in accordance with a default routing rule. The processor 1210 may then route the received telephone to the selected service representative terminal.

The programs 1212, 1214 may be stored in a compressed, uncompiled and/or encrypted format. The programs 1212, 1214 may furthermore include other program elements, such as an operating system, a database management system, and/or device drivers used by the processor 1210 to interface with peripheral devices.

As used herein, information may be "received" by or "transmitted" to, for example: (i) the communications server 1200 from another device; or (ii) a software application or module within the communications server 1200 from another software application, module, or any other source.

In some embodiments (such as shown in FIG. 12), the storage device 1230 further stores a relational database routing matrix database 1300, insurance data 1260 (insurance policy details), and override flags and defaults 1270. An example of a database that may be used in connection with the communications server 1200 will now be described in detail with respect to FIG. 13. Note that the database described herein is only one example, and additional and/or different information may be stored therein. Moreover, various databases might be split or combined in accordance with any of the embodiments described herein. For example, the insurance data 1260 and/or override flags and defaults 1270 might be combined and/or linked to each other within the communications engine 1214.

Referring to FIG. 13, a table is shown that represents the relational database routing matrix database 1300 that may be stored at the communications server 1200 according to some embodiments. The table may include, for example, entries identifying business rules and algorithms that may define telephone call routing for an enterprise. The table may also define fields 1302, 1304, 1306, 1308, 1310 for each of the entries. The fields 1302, 1304, 1306, 1308, 1310 may, according to some embodiments, specify: a DNIS 1302, a flag 1304, a condition 1306, a value 1308, and a CSR identifier 1310. The relational database routing matrix database 1300 may be created and updated, for example, based on information received from an operator or administrator.

The DNIS 1302 may be, for example, a unique alphanumeric code identifying a particular telephone line. The flag 1304, condition 1306, and value 1308 may define an operation to be evaluated for the DNIS 1302. The CSR identifier 1310 may indicate a result or selecting of that evaluation. For example, when a customer dials "1-800-555-1001" he or she may interact with an IVR platform and indicate a preferred language. The IVR platform may then store the customer's answer as a flag associated with that telephone call. The relational database routing matric database 1300 may be accessed and the flag 1304 ("Language"), condition 1306 ("Equals"), and value 1308 ("Spanish") may be evaluated. If the evaluation is true, a CSR identifier 1310 of "CSR_101") is established and used to route the customer's telephone call. Note that the condition 1306 might implement any type of business rule or logic (e.g., greater than, less than, or within a pre-determined range of value). Moreover, note that any type of data storage scheme might be associated with a routing matrix, including RDBMS, Indexed Sequential Access Method ("ISAM"), a series of flat files, and/or other types of programming code.

Accordingly, some embodiments may define a work stream that provides a scalable model for telephone call control. The model may support an enterprise such that as new lines of business are brought onboard or dissolve into one other, the model may still provide appropriate telephone call routing without custom programming. The model may also support the indicators or "flags" attached to telephone calls in the IVR. The backend model may support a GUI that is scalable and dynamic. Quality enforcement may be provided by enforcing rules as part of the application (not user) process, by web service checks validate route points, by transparency in configuration, by simplification of inputs, and by Just-In-Time ("JIT") updates and analysis. Additionally, the system may provide secondary checks based on returned values and configurations. These secondary checks may provide exception reporting when flags are not programmed, in error, yet are still being tagged to telephone call in by an IVR platform. Moreover, some embodiments described herein may bulk load changes. For example, a system associated with tens of thousands of records may need to be updated (e.g., to retire an end point). In this case, one or more incoming telephone numbers may be associated with a need customer service representative queue via a bulk load update.

Figure 14:
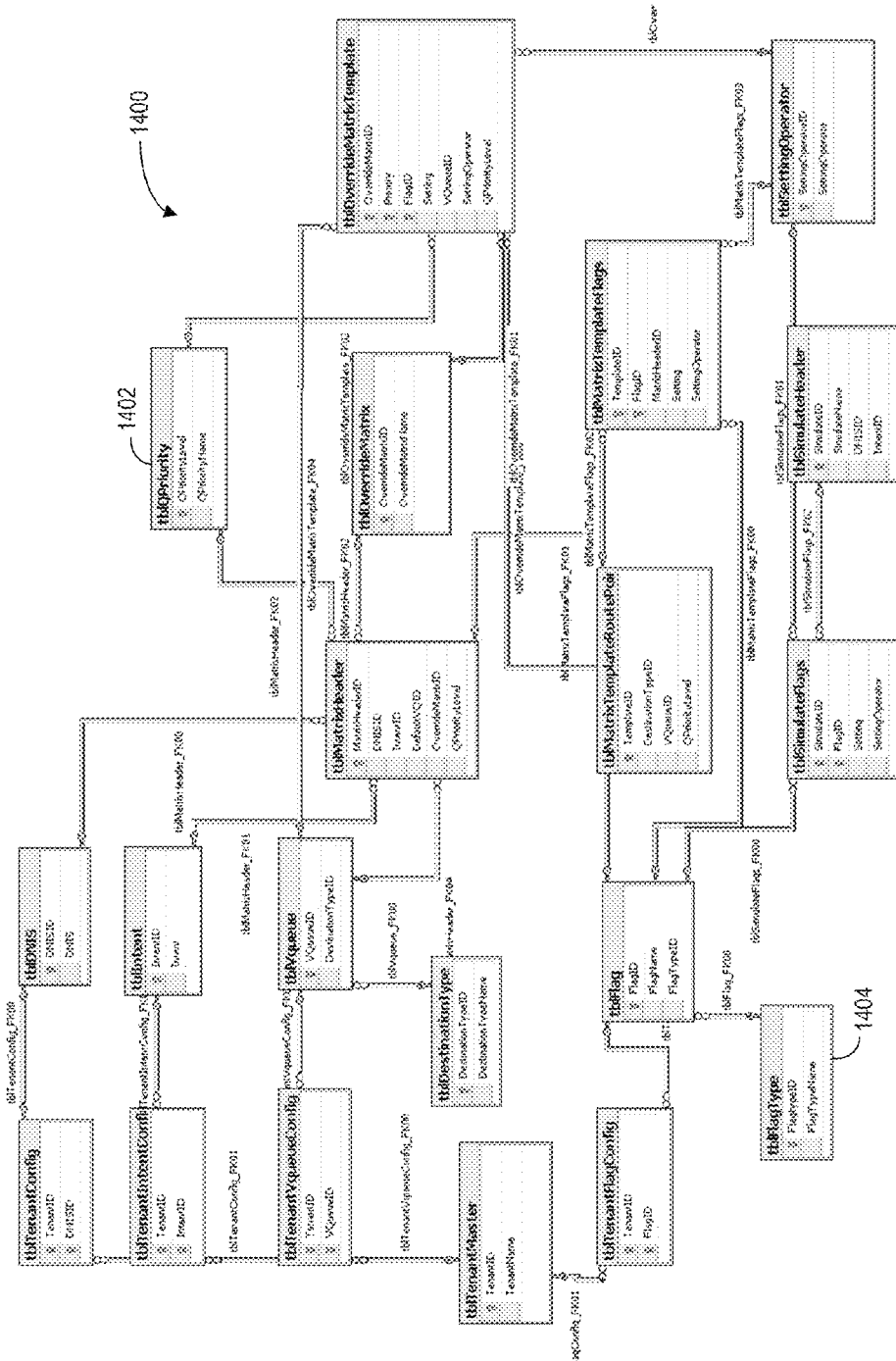
FIG. 14 illustrates elements of a relational data model in accordance with some embodiments described herein.

FIG. 14 illustrates elements of a relational data model 1400 in accordance with some embodiments described herein. The relational data model 1400 may depict data stored in tables and the relationships between the elements. According to some embodiments, elements may be associated with DNIS information, queues, override flags, default routing, priority values 1402, simulations, and/or individual flags 1404. Note that the relational data model 1400 may help ensure situational integrity for the system. According to some embodiments, an operator may use a form to update multiple tables, and some of the complexity may be encapsulated in a process or view. The header and child structure in the user interface may reduce complexity as it relates to the intuitiveness and usability from an end user's perspective. Moreover, the relational matrix leverages an RDBMS (SQL Server) at an enterprise level to facilitate configuration, administration, and business rules for call routing.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Applicants have discovered that embodiments described herein may be particularly useful in connection with insurance policies associated with injuries occurring at a client's location or as a result of client's involvement. Note, however, that other types of insurance policies may also benefit from the invention. For example, embodiments of the present invention may be used in connection with automobile insurance policies, etc. Moreover, although some embodiments have been described with respect to the routing of telephone calls, note that any of the embodiments might instead be associated with other types of incoming communications, such as email messages and/or postal mail.

Figure 15:
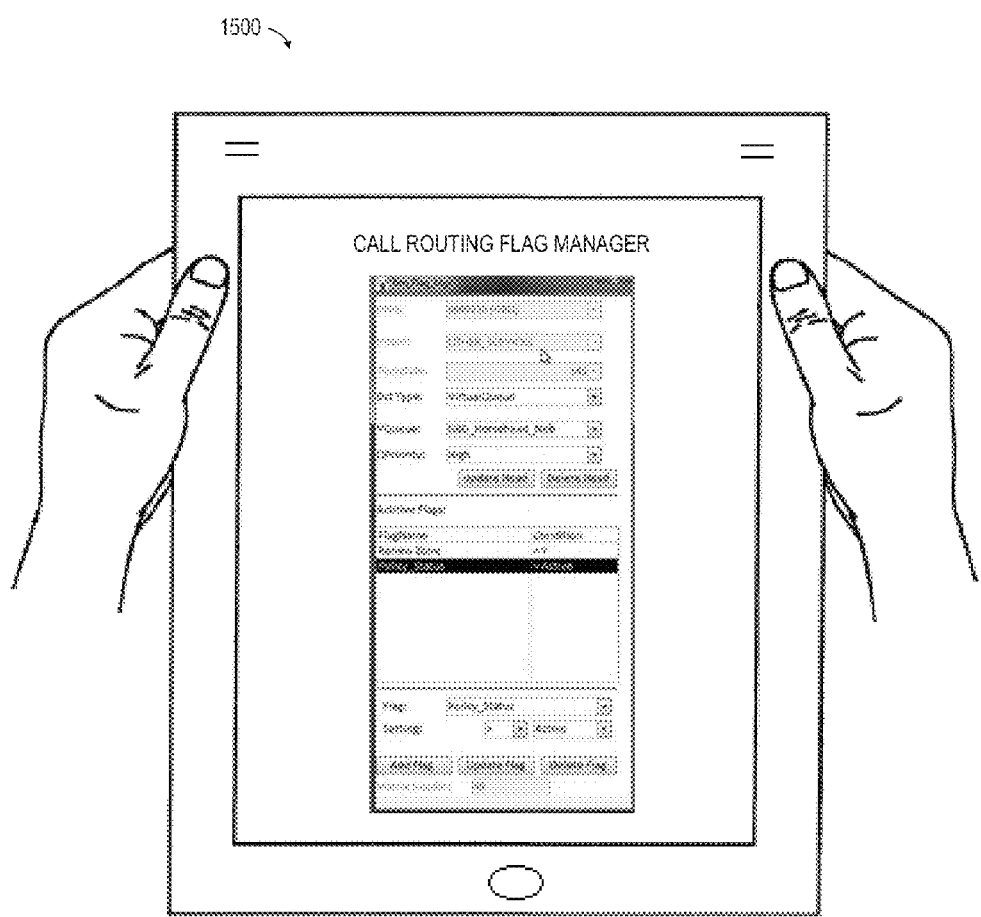
FIG. 15 illustrates a handheld tablet display in accordance with some embodiments described herein.

Moreover, some embodiments have been described herein as being accessed via a PC or laptop computer. Note, however, that embodiments may be implemented using any device capable of executing the disclosed functions and steps. For example, FIG. 15 illustrates a display 1500 in accordance with some embodiments described herein. In particular, the display 1500 includes a graphical user interface including information about managing flags for a telephone call routing matrix.

In addition to simulating incoming telephone calls, some embodiments may re-evaluate historic calls to determine if they are ultimately routed properly. For example, historic calls can be re-evaluated after changes are made to the model, in a quality assurance environment, to determine if changed settings meet business routing expectations and result in decreased testing and shortened release schedules.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A communications server, comprising:
a communication device to receive a telephone call associated with an insurance claim;
a relational database platform storing a telephone call routing matrix;
a processor coupled to the communication device and the relational database platform; and
a storage device in communication with said processor and storing instructions adapted to be executed by said processor to:
automatically determine an insured and a document identifier associated with the telephone call;
attempting to match information about the telephone call with at least one override flag to select a service representative terminal;
if the information about the telephone call does not match the at least one override flag, access the telephone call routing matrix to attempt to select a service representative terminal for the received telephone call based on information in the routing matrix, the insured, and the document identifier; and
if a service representative terminal is not selected based on the telephone call routing matrix, select a service representative terminal in accordance with a default routing rule; and
route the received telephone to the service representative terminal.

2. The communications server of claim 1, the storage device further storing instructions adapted to be executed by said processor to:
transmit an indication of a queue priority value for the received telephone call based on at least one of: (i) an override flag, (ii) the telephone call routing matrix, and (iii) a default queue priority value.

3. The communications server of claim 1, the storage device further storing instructions adapted to be executed by said processor to:
determine supplemental information about a customer associated with the telephone call, wherein said selection is further based on the supplemental information.

4. The communications server of claim 3, wherein the supplemental information is determined via at least one of: (i) an interactive voice recognition system, (ii) a customer response, and (iii) pre-stored customer information.

5. The communications server of claim 3, wherein the supplemental information includes at least one of: (i) a customer identifier, (ii) a claim identifier, (iii) the document identifier, (iv) a product identifier, and (v) geographic information.

6. The communications server of claim 1, wherein the selection of a service representative terminal is based at least in part on: (i) dialed number information service data, (ii) a business rule, (iii) product information, (iv) a language preference, (v) queue information, and (vi) a service representative skill.

7. The communications server of claim 1, the storage device further storing instructions adapted to be executed by said processor to:
simulate, by an administrator, receipt of a simulated telephone call, wherein the selection selects a service representative terminal for the simulated telephone call.

8. The communications server of claim 1, the storage device further storing instructions adapted to be executed by said processor to:
interact with an end-user via a graphical user interface to adjust the telephone call routing matrix stored on the relational database platform.

9. A communications server, comprising:
a communication device to receive a telephone call associated with an insurance claim;
a relational database platform storing a telephone call routing matrix;
a processor coupled to the communication device and the relational database platform; and
a storage device in communication with said processor and storing instructions adapted to be executed by said processor to:
automatically determine an insured and an insurance policy identifier associated with the telephone call;
attempt to match information about the telephone call with at least one override flag to select an insurance claim handler;

if the information about the telephone call does not match the at least one override flag, access a telephone call routing matrix stored on a relational database platform to attempt to select an insurance claim handler for the received telephone call based on information in the routing matrix, the insured, and the insurance policy identifier;

if an insurance claim handler is not selected based on the telephone call routing matrix, select an insurance claim handler in accordance with a default routing rule;

route the received telephone to the insurance claim handler; and simulate, based on information received from an administrator via a graphical user interface, receipt of a simulated telephone call, wherein said simulating includes selection of an insurance claim handler for the simulated telephone call.

10. The communications server of claim 9, the storage device further storing instructions adapted to be executed by said processor to:

transmit an indication of a queue priority value for the received telephone call based on at least one of: (i) an override flag, (ii) the telephone call routing matrix, and (iii) a default queue priority value.

11. The communications server of claim 9, the storage device further storing instructions adapted to be executed by said processor to:

determine supplemental information about a customer associated with the telephone call, wherein said selection is further based on the supplemental information.

12. The communications server of claim 11, wherein the supplemental information is determined via at least one of: (i) an interactive voice recognition system, (ii) a customer response, and (iii) pre-stored customer information.

13. The communications server of claim 11, wherein the supplemental information includes at least one of: (i) a customer identifier, (ii) an insurance claim identifier, (iii) the insurance policy identifier, (iv) an insurance product identifier, and (v) geographic information.

14. The communications server of claim 9, wherein the selection of an insurance claim handler is based at least in part on: (i) dialed number information service data, (ii) a business rule, (iii) insurance product information, (iv) a language preference, (v) queue information, and (vi) a service representative skill.

15. The communications server of claim 9, the storage device further storing instructions adapted to be executed by said processor to:

interact with an end-user via a graphical user interface to adjust the telephone call routing matrix stored on the relational database platform.

16. A computer-implemented method for routing telephone calls within a network, comprising:

simulating, based on information received from an administrator via a graphical user interface, receipt of a simulated telephone call by a computer processor of a communication server;

attempting, by the computer processor of the communications server, to match information about the simulated telephone call with at least one override flag to select a service representative terminal;

if the information about the simulated telephone call does not match the at least one override flag, accessing a telephone call routing matrix, by the computer processor of the communications server, to attempt to select a service representative terminal for the simulated telephone call;

if a service representative terminal is not selected based on the telephone call routing matrix, selecting, by the computer processor of the communications server, a service representative terminal in accordance with a default routing rule; and transmitting an indication of the selected service representative terminal from the communications server.

17. The method of claim 16, further comprising:

transmitting an indication of a queue priority value for a received telephone call based on at least one of: (i) an override flag, (ii) the telephone call routing matrix, and (iii) a default queue priority value.

18. The method of claim 17, further comprising:

automatically arranging for a received telephone call to be routed in accordance with the selected service representative terminal.

19. The method of claim 16, further comprising:

determining supplemental information about a customer associated with a received telephone call, wherein said selected is further based on the supplemental information.

20. The method of claim 19, wherein the supplemental information is determined via at least one of: (i) an interactive voice recognition system, (ii) a customer response, and (iii) pre-stored customer information.

21. The method of claim 19, wherein the supplemental information includes at least one of: (i) a customer identifier, (ii) an insurance claim identifier, (iii) an insurance policy identifier, (iv) an insurance product identifier, and (v) geographic information.

22. The method of claim 16, wherein the selection of the service representative terminal is based at least in part on: (i) dialed number information service data, (ii) a business rule, (iii) insurance product information, (iv) a language preference, (v) queue information, and (vi) a service representative skill.

23. The method of claim 19, further comprising:

interacting with an end-user via a graphical user interface to adjust the telephone call routing matrix stored on the relational database platform.

* * * * *